United States Patent [19]

Murphy

[11] Patent Number: 4,500,816
[45] Date of Patent: Feb. 19, 1985

[54] CONVERGENCE CONTROL APPARATUS FOR COLOR CATHODE RAY TUBE DISPLAY SYSTEMS

[75] Inventor: Charles J. Murphy, Glendale, Ariz.

[73] Assignee: Sperry Corporation, New York, N.Y.

[21] Appl. No.: 477,209

[22] Filed: Mar. 21, 1983

[51] Int. Cl.³ .................. H01J 29/70; H01J 29/76
[52] U.S. Cl. .................................................. 315/368
[58] Field of Search .............. 315/13 C, 368; 335/213; 313/412

[56] References Cited

U.S. PATENT DOCUMENTS

| | | | |
|---|---|---|---|
| 3,766,429 | 10/1973 | Vincent et al. | 315/13 C |
| 3,942,067 | 3/1976 | Cawood | 315/368 |
| 4,095,137 | 6/1978 | Oswald | 315/13 C |
| 4,203,054 | 5/1980 | Sowter | 315/368 |
| 4,318,032 | 3/1982 | Kureha | 315/13 C |

Primary Examiner—Theodore M. Blum
Attorney, Agent, or Firm—Howard P. Terry

[57] ABSTRACT

An active convergence correction apparatus for a full color cathode ray tube display of the delta gun shadow mask type wherein the horizontal and vertical parabolic waveshape compensation signals are generated by squaring circuits responsive to the horizontal and vertical deflection signals and wherein zero crossing detectors also responsive to the horizontal and vertical deflection signals, which effectively divide the viewing screen into rectangular coordinates, control switches which split each of the horizontal and vertical parabolic waveshape signals in half, whereby the relative amplitudes of each half can be independently controlled to achieve precise convergence in all sectors of the screen.

9 Claims, 13 Drawing Figures

(a)

(b)

(c)

(d)

(e)

(f)

(g)

(h)

(i)

(j)

(k)

(l)

(m)

(n)

(o)

CONVERGENCE CONTROL APPARATUS FOR COLOR CATHODE RAY TUBE DISPLAY SYSTEMS

BACKGROUND OF THE INVENTION

1. Field of the Invention

The present invention relates generally to cathode ray tube displays of the delta gun, shadow mask type. More particularly, the invention relates to improved convergence control apparatus for such systems.

2. Description of the Prior Art

Cathode ray tube (hereinafter CRT) full color displays, such as for example, those designed for displaying flight and navigation information to the pilots of an aircraft, require high resolution images which may be stroke written or raster written. In order to achieve such high resolution images, particularly those involving thin stroke written lines (alphanumerics, flight paths, target designators, etc.), superior convergence control is required.

As is well known to those skilled in the art of delta gun shadow mask type CRT's, each electron beam must precisely converge on a common hole in the shadow mask so that, upon exit therefrom, each beam strikes its corresponding color phosphor dot of the phosphor triea. Further, this convergence must be controlled with great precision not only when the beams are undeflected by the deflection coils, known as static convergence, but also throughout the full deflection range of the display, known as dynamic convergence. Also, as is well known in this type of tube, manufacturing tolerances in the assembly of the guns in the tube neck and possible stray magnetic fields in the display's environment, require adjustable magnetic fields adjacent the guns to achieve precise static convergence, while variable magnetic fields also adjacent the guns are required to assure precise convergence of the three beams as they are deflected by the deflection system across the entire face of the CRT. Dynamic convergence control is required due to the fact that most display screens are generally flat or only slightly convex relative to the point along the tube axis at which the beams are angularly deflected by the deflection coils, generally known as the pin cushion effect.

A number of techniques have been employed in the past for achieving static and dynamic convergence. Static convergence has been accomplished by employing manually adjustable permanent magnets supported on the tube neck to produce a magnetic field of adjustable direction and magnitude to cause the three electron beams to precisely converge at the center of the shadow mask. Both static and dynamic convergence have been achieved with some success in the past using a common electromagnetic convergence yoke fixed on the neck of the CRT which cooperates with internal pole pieces downstream from each of the three cathodes or electron guns. Controllable magnetic fields are produced across these internal pole pieces by controlling electrical current to the windings of each electromagnets as a function of the position of the beams as they are deflected by the deflection yoke horizontally and vertically across the tube screen.

The convergence control currents supplied to the convergence yoke coils have been generated in the past by a number of techniques. In some cases, these currents have been generated by wholly passive pulse shaping circuits using diodes, resistors, capacitors, inductances, etc. to produce the desired generally parabolic wave shapes. However, with such passive techniques, there is no independent control of the precise wave shapes for the individual electron guns. Furthermore, there is little or no control for convergence at specific points on the CRT screen. Additionally, the convergence signals generated interact with each other so that adjustment on one side of the screen can affect convergence on the opposite side. Procedures to achieve convergence using passive techniques require an interactive approach which results in a best achievable over-all convergence compromise making adjustment difficult and tedious.

Another convergence control technique used in the past employs digital rather than analog apparatus. With this technique, the screen is divided into a planar matrix of blocks, the total number of which depend upon the desired resolution or picture quality. The conversion currents required for each block of this matrix is stored in digital format in read only memories which are addressed as a function of beam position to read out the required conversion currents. Of course, the memory outputs require digital and analog conversion, suitable resistive mixing in the proper proportions to produce each of the three convergence signals for driving the coils of the convergence yoke electromagnets. While the digital convergence technique permits independent adjustment of each color and independent adjustment of convergence in each screen quadrant, it does have certain drawbacks. The resolution of the convergence correction is dependent upon the number of blocks in the screen matrix which in turn is dependent upon the size of the digital memories; the larger the number of blocks, the larger the memories and hence the ultimate cost. Also, the requirement for digital processing, such as A/D's, and D/A's further increases costs. Another drawback is the granularity typical of digital systems. For example, as the beams are deflected into the corners of the screen, the change in the required correction voltage from one block to an adjacent block becomes larger creating discontinuities or steps in the waveforms upon D/A conversion and objectionable patterns of faint lines in the corner regions of the screen.

A further technique used in the more recent past uses an active conversion correction technique. Basically, this type of convergence correction replaces both the digital technique and the passive amplitude-tilt technique of matching the well known parabolic waveforms to the screen with a technique that time divides each of the parabolic convergence waveforms vertical and horizontal into two halves thereby permitting adjustment of each half of the waveforms independently to achieve each of the required parabolic waveshapes across the tube face. In the known active techniques, the horizontal and vertical deflection sawtooth waveforms are filtered to remove undesired frequency components and then supplied to integrating circuits which serve to shape the input waves into appropriate parabolic waves. After proper shaping has been achieved, the waveforms are split in half and separately amplitude adjusted and recombined to form the vertical and horizontal components of the red, green and blud convergence signals. Additionally, corner convergence signals are generated by passive components means from the vertical sawtooth waveform and the horizontal parabola and combined with the horizontal convergence signal to produce the corner corrected horizontal convergence signals for the red and green beams. The vertical and horizontal convergence components are then fed to two single ended Class A transistor amplifiers which drive two separate windings (one for vertical and one horizontal) on each convergence yoke. The vertical and horizontal convergence component are added by the magnetic fields of the yoke to produce the complete red, green and blue convergence signals necessary to converge the beams.

The active conversion correction technique suffers from several drawbacks. The means for generating the parabolic waves from deflection sawtooths relies on passive integrators which are frequency sensitive and with work only on raster scan systems. Stroke writing displays have random deflection input waveforms making passive integrators unusable. Corner correction is also done with passive component waveshaping making it unusable in stroke writing displays. These systems employ single ended Class A transistor amplifiers to drive the convergence yoke windings. This type of yoke drive has several disadvantages. Amplifier current bandwidth is difficult to control. Current bandwidth of the convergence yoke driver must be approximately the same as the bandwidth of the deflection amplifier in stroke written displays. Heating in the coil windings cause the resistance of the windings to increase and will reduce the current through the winding causing a convergence error.

The convergence correction control apparatus of the present invention overcomes the difficulties of the prior art techniques. It provides high resolution, precision adjustment of all the parameters involved and requires only analog circuits thereby maximizing over-all accuracy and resolution and minimizing over-all costs.

Conversion correction yokes used in the past have suffered from electrical and mechanical complexity and delicacy. For example, such yokes utilize two convergence coils per electron gun, one for vertical correction and one for horizontal correction. Some used a single coil driver by the sum of the vertical and horizontal correction signals. Mechanically, both designs consist of a U-shaped ferrite core structure with windings on each leg. An air gap is cut in the center of the core and a wheel-shaped permanent magnet is placed over the gap. The resulting structure is mechanically delicate and difficult to package with the CRT and subject to shifting, particularly in a high vibration environment. Further, such yokes have relatively low sensitivities necessitating larger driving currents. The present invention provides a greatly improved convergence correction yoke design that provide high electrical sensitivity but is also simple and rugged mechanically.

SUMMARY OF THE INVENTION

The present invention consists of circuitry for generating convergence correction signals for each of the three convergence yoke coils which provide convergence deflection for their corresponding electron gun in the delta gun-color CRT. This invention also provides for a convergence yoke coil that has increased sensitivity and is easier to manufacture. The convergence correction signals generated are independently adjustable at the top, bottom, left and right sides of the CRT screen. This provides for precise adjustment of convergence in any one of the four quadarants independently of any other quadrant. The adjustments for each color have been arranged such that blue convergence can be adjusted independently of red and green convergence. The red and green convergence adjustments have been linked together to make convergence changes during alignment easier to see and adjustment easier. This improved convergence system allows alignment to be done with minimal time and effort.

The analog convergence system employs two analog squaring circuits, one for the vertical and one for the horizontal deflection channel signals. These circuits square the input deflection signals which can be rampwaveforms in raster scan mode or random waveforms in stroke mode and produce parabolic output waveforms required for convergence. The input deflection signals are also inputted to zero crossing detectors, one for each channel which produce a digital signal indicative of the polarity of the deflection signal and which half of the screen the beam is in for each deflection channel. These signals, in addition to their respective analog squarer outputs are fed into a parabola wave divider which splits the parabolic squarer output in such a way as to produce two parabola waveform halves, one half corresponding to the left side of the screen and the other half to the right side of the screen, in the case of the horizontal deflection, and top and bottom halves in the case of vertical deflection. The divided parabola signals are then sent to analog voltage dividers which adjust the amplitude of each parabola waveform half, in addition to the over-all amplitude of the waveform. The resulting output of the two dividers, which are the red, green and blue convergence signals from both the vertical and horizontal deflection channels, are summed together to produce a composite red, green and blue convergence signal. DC offsets are also summed with the convergence signals to provide static or center convergence correction.

Acceptable convergence cannot, however, be obtained in the CRT screen corners with the vertical and horizontal convergence signals alone. This arises from the fact that the magnetic field required to converge the beams on the CRT screen corners is not the resultant magnetic field produced by the sum of the vertical and horizontal convergence signals. For this reason, additional circuitry must be added to correct for these effects. This circuitry is implemented in the present invention in four separate circuits which provide corner convergence correction for the red and green beams on the left side of the screen and also for the red and green on the right side of the screen. The blue beam is aligned with the CRT axis in vertical direction and requires no special correction since dynamic movement is possible only in the vertical direction.

The corner convergence signals red left and right side are summed with the red composite signal along with the static convergence offset to produce a complete red convergence signal. The same is done with the green corner convergence signals yielding a complete green convergence signal. Since the blue beam has no corner term, its complete signal consists of the offset term and the composite signal. These convergence signals are then fed to the convergence yoke drivers one for each gun which consist of wide bandwidth power operational amplifiers configured as transconductance or voltage to current converters. This allows precise control over convergence yoke coil current and convergence correction. Since the amplifier feedback loop is closed around the yoke coil, pulse response and small signal bandwidth of the amplifier may be tailored as required.

The present invention also employs a toroid type yoke core with windings distributed over the periphery of the core. The new structure is mechanically strong and easy to package. Its sensitivity is increased over the old design due to the elimination of the air gap and a core shape that reduces magnetic field fringing. This makes it possible to eliminate permanent magnets and efficiently control both static and dynamic convergence by the single winding. The correction signals driving these yokes are generated by analog means in the present invention in such a way that the correction signals for each beam can be individually controlled over the entire screen. The red and green beam adjustments have been linked together, however, to make adjustment easier. Additionally, the individual beams can be converged independently in each of the four quadrants of the CRT screen. The analog method of convergence waveform generation eliminates the waveform inaccuracies of the passive convergence system and the digitizing errors of the digital convergence system.

BRIEF DESCRIPTION OF THE DRAWINGS

A preferred embodiment of the invention is illustrated in the accompanying drawings wherein.

DESCRIPTION OF THE PREFERRED EMBODIMENT

Figure 1:
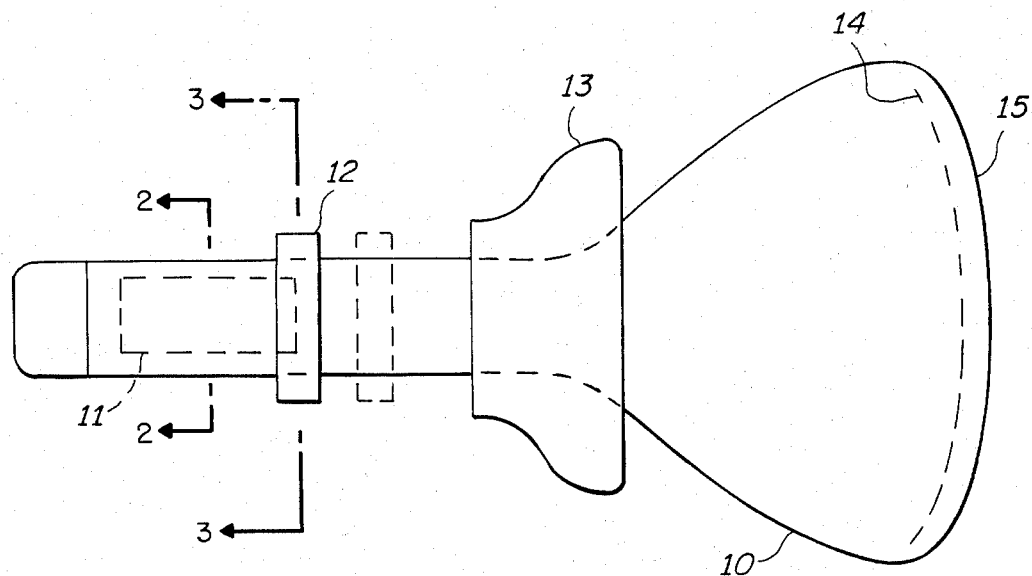
FIG. 1 is a simplified showing of a conventional shadow mask type color cathode ray tube incorporating the convergence correction yoke of the present invention.
Figure 2:
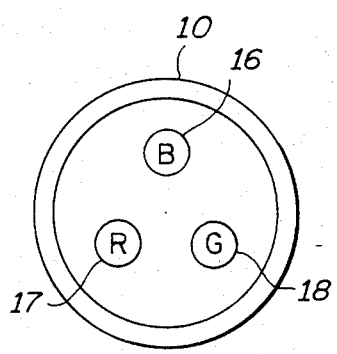
FIG. 2 is a cross-section of the CRT of FIG. 1 taken on line 2—2 thereof.

Referring now to FIG. 1, there is schematically illustrated a full-color cathode ray tube of the delta gun, shadow mask type comprising conventional tube envelope 10 having a delta cathode or electron gun assembly 11, convergence correction yoke 12, hereinafter more fully described, conventional horizontal and vertical deflection yoke 13, shadow mask 14 and viewing screen 15, The gun assembly 11 comprises three separate cathodes designated as blue cathode 16, red cathode 17, and green cathode 18, arranged 120° apart and conventionally supported in the tube neck such that the undeflected electron beams will converge on the center hole of the shadow mask 14 and emerge so as to impinge on the blue, red, and green phosphor dot treads of the screen 15. Ideally, the electron beam from the gun corresponding to the desired color should impinge only on the phosphor dot that produces that color and this should occur for all possible deflected positions of the beams. If they are not precisely so converged, pure colors cannot be produced due to overlapping of the beams on other than their respective phosphor dots. It is the purpose of the present invention to assure substantially perfect convergence of the beams over the entire usable face of the CRT. This is accomplished by means of the improved convergence correction electronic system of FIGS. 4 and 5 and the improved convergence correction yoke 12 of FIG. 3. Generally, the yoke 12 produces precisely controlled electromagnetic fields adjacent the respective electron beams as they emerge from their respective cathode guns as will be described hereinbelow with respect to FIG. 3, and effectively bend the beams to assure that they always pass through the same hole of the shadow mask as the beams are deflected to produce the imagery on the CRT display face. The foregoing correction is required because of manufacturing tolerances in aligning the guns in the tube neck and possible non-uniformity of the fields of deflection yoke 13.

In the application of the present invention, the color CRT is used for displaying both alphanumeric and radar scan imagery in either stroke or raster scan mode. In the case of the latter, in the stroke display mode, the deflection waveforms are of a random nature and serve to position the beam to a specific point on the CRT face and draw the specific characters required for the desired character font being displayed. This is done in accordance with a program stored in the display symbol generator and is updated at such a rate as to be above the critical fusion frequency of the eye giving the displayed image a continuous, flicker-free appearance. The raster scan mode is generated using well known interlace scanning techniques. In one application, the face of the CRT is divided into 525 scan lines which are scanned at a horizontal rate of 15750 Hz and a vertical rate of 60 Hz. The present invention must be capable of operating in both scan modes in order to converge the electron beams in all regions of the CRT screen and does so by generating convergence correction waveforms as a function of beam position on the CRT screen independently of the type of scan being used. Convergence correction in delta gun, shadow mask color CRT displays is well understood by those skilled in the art and is described extensively in the literature. Such effects as pin cusion distortion, astigmatism, coma and corner correction are well known and need not be discussed. It is also understood that the primary function of the convergence correction system of this type of color CRT is to generate parabolic waveshapes for both horizontal and vertical beam deflections and for each of the blue, red and green beams and to supply these waves to the blue, red and green coils of the convergence correction yoke in the CRT neck, so as to cause the three electron beams to converge at each hole in the shadow mask as the beam is swept over the entire tube face by the deflection system. Also, special shaping is required to assure beam convergence in the corners of a rectangular shaped tube face. The convergence correction system of the present invention provides superior convergence correction resulting in a very high resolution color display of both raster generated symbology and stroke written symbology. Generally, the present invention relates to the time-divided or split parabolic wave type of convergence correction referred to above.

In the following description, reference will be made to both the over-all system block diagram of FIG. 4 and the detailed schematic diagrams of FIGS. 5A, B, C and D. The dotted blocks of the latter generally correspond to the solid blocks of the former and carry the same reference characters.

As in all convergence correction systems, since the correction is a function of beam position, the reference for the system is the beam horizontal and vertical deflection signals. Also, although the systems of the invention is operable in either the stroke mode or raster mode of operation, the raster mode will be discussed in detail. In effect, the raster scan signals serve to divide the screen face into four quadrants having its origin at the screen center with X and Y deflection signals positive in the upper right quadrant. FIG. 6A shows the familiar horizontal deflection signal for a raster scan and this signal is applied to input terminal 20 of the X-deflective channel of FIGS. 4 and 5A. This signal is applied to a conventional zero-crossing detector 21 (ZCD) typically a Schmitt trigger, which therefore senses when the beam goes from the left side of the screen to the right (or from the top to the bottom in the Y-deflection case), that is, which quadrant the beam is in. For example, as the horizontal deflection voltage passes through zero going negative as between D and E of FIG. 6A, the output on lead 22 goes high and will stay high until the next crossing, i.e., as the signal goes through zero in the positive-going direction, from B and C of FIG. 6A. Thus, the ZCD serves to generate a series of square wave pulses which, as will be seen, is used as switch control pulses for splitting the parabolic convergence correction waves.

Figure 5A:
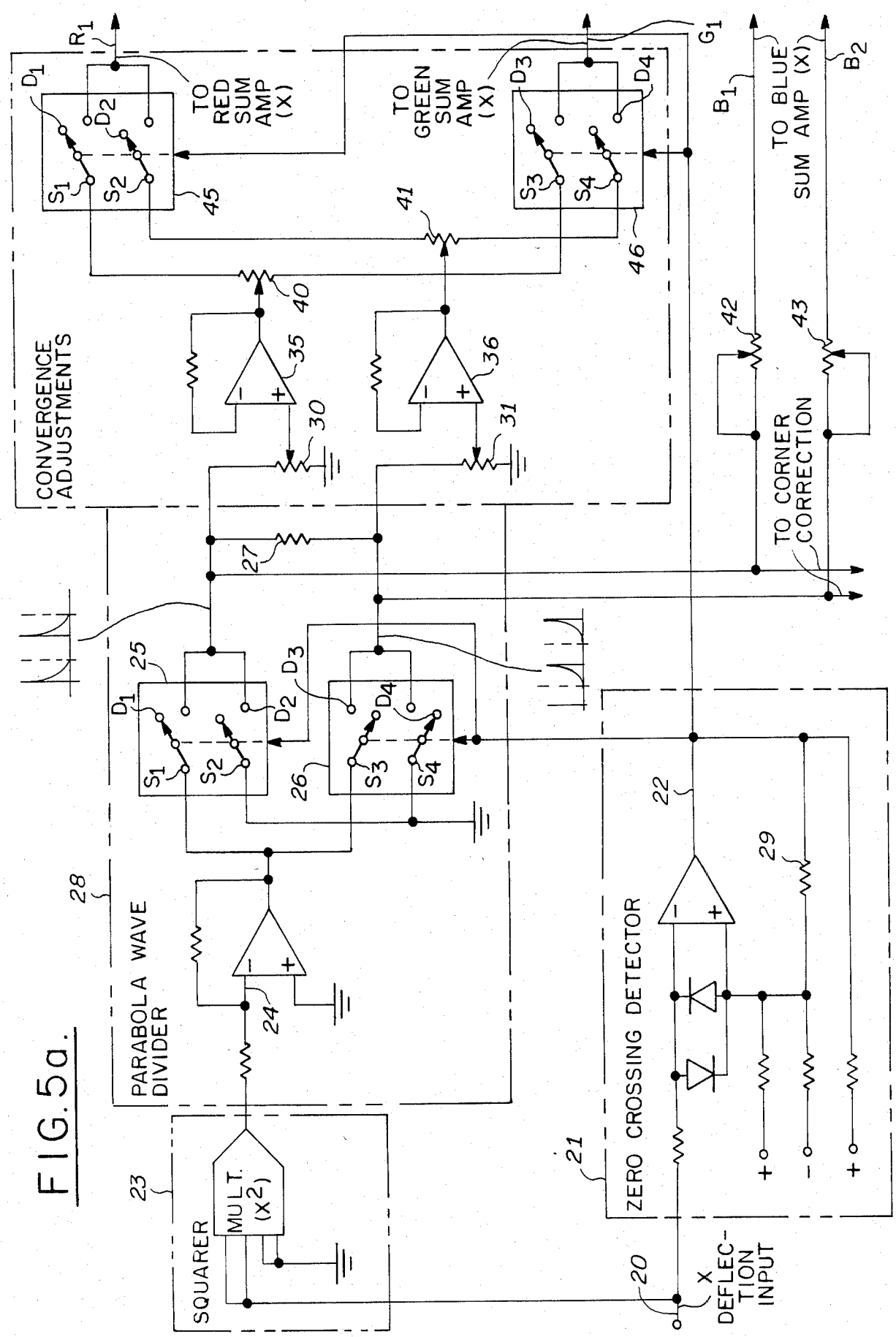
FIG. 5, comprising FIGS. 5A, 5B, 5C and 5D taken together, constitute a schematic diagram of the system of the present invention.
Figure 5B:
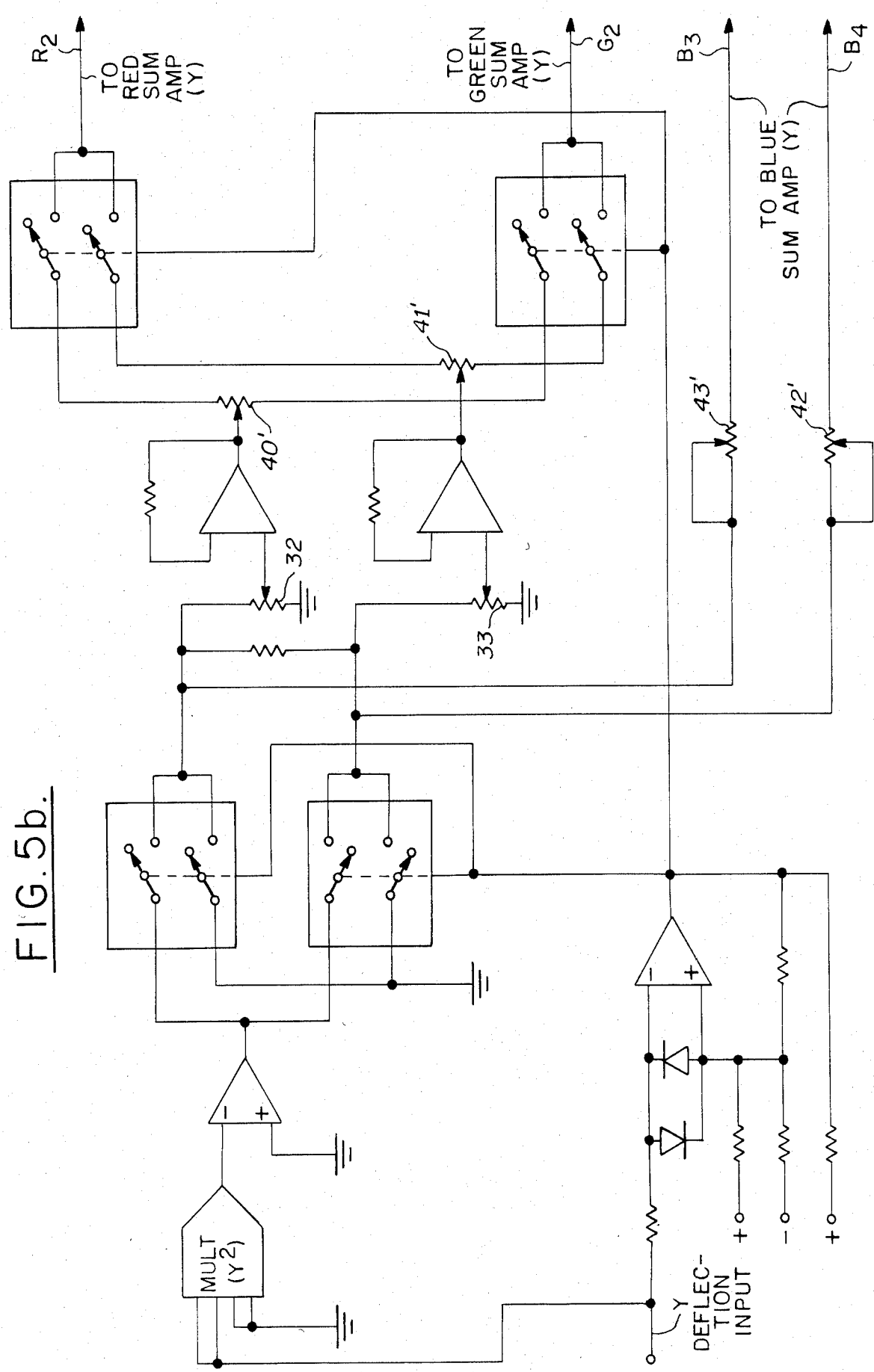
Figure 6:
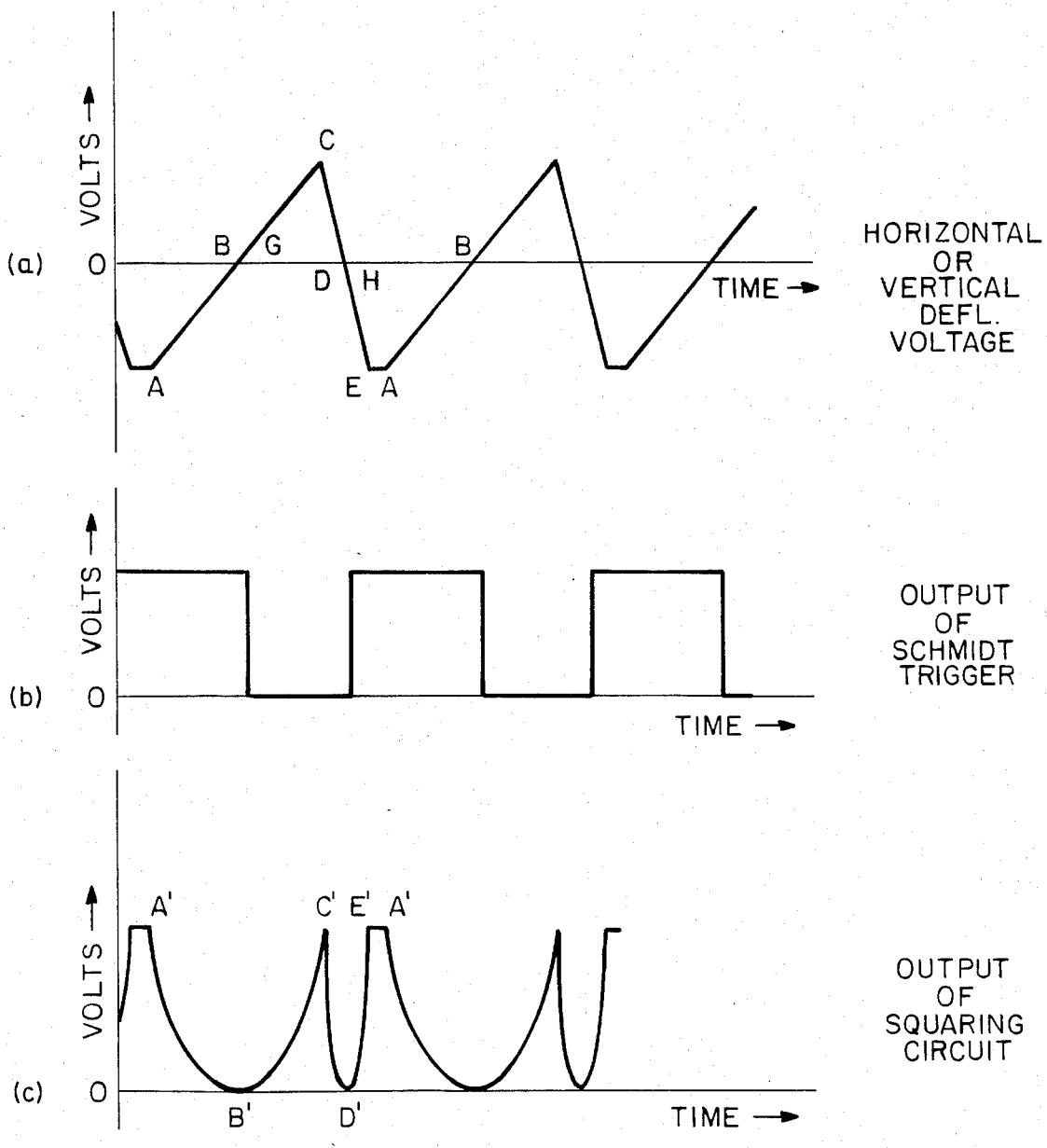
FIGS. 6 through 10 are graphical diagrams useful in understanding the operation of the present invention.

In order to generate the desired parabolic waveform from the X-deflection signal at input 20, it is supplied to the input of a conventional squaring circuit 23 which generates the parabolic waveforms shown at (c) in FIG. 6 on output lead 24. As shown, the segment A-B of the deflection sawtooth is a ramp function with a positive slope and therefore when it is square the signal on lead 24 has a positive polarity parabolic waveshape A'-B' of FIG. 6C. Similarly, the segment B-C of the sawtooth upon squaring produces the other half B'-C' of the complete parabolic wave. Further, the steep negative going segment C-D-E of FIG. 6A corresponds to the horizontal retrace and when squared produces the parabolic waves C'-D'-E'. The parabolic waveform signal on lead 24 is suitably amplified and applied as inputs to electronic double pole, double throw switches 25 and 26, the positions of which are controlled by the square wave pulse train on lead 22 from ZCD 21. As shown in FIG. 5A, switches 25 and 26 have their terminals $S_1$ and $S_3$ connected to receive the parabolic waveform signal on lead 24 and their terminals $S_2$ and $S_4$, respectively, connected to ground while their terminals $D_1$ and $D_4$ and terminals $D_2$ and $D_3$, respectively, are connected across load resistor 27. The switches 25 and 26 constitute a wave divider or wave splitter 28. With the switches 25 and 26 in the position shown, i.e., the beams are in the left portion of the screen, the left half of the parabolic wave signal appears across load resistor 27 and also across potentiometer 30. When the beams are in the right-hand sectors of the screen, the righthand half of the parabolic wave signal appears across the load resistor 27 and also across potentiometer 31. The corresponding Y-channel switches of FIG. 5B operate in the same manner to place the upper and lower halves of the X-axis parabolic wave signals across potentiometers 32 and 33.

It should be noted here that the ZCD is designed with a small amount of hysteresis (G and HO), as by feedback resistor 29, in order to provide noise immunity and rapid output transition for slowly varying input signals as shown in FIGS. 6A and B; the upper trip point G may cause a slight error in detecting the beam crossing the X (or Y) axis but this can be minimized to be negligible by limiting the feedback to only a few percent.

Referring again to FIG. 6, it is seen that for the negative portion of the sawtooth D (actually H)-E-A-B (actually G), the output of the ZCD is a logical high while that of the positive portion B (actually G)-C-D (actually H) is a logical low. In other words, when the beam is in the righthand quadrants of the screen, the square wave is low and when in the left side, it is high. The foregoing may be summarized in the following table for both horizontal and vertical deflection:

| Beam Location | ZCD Output Horizontal | ZCD Output Vertical |
| --- | --- | --- |
| Quadrant 1 | Low | Low |
| Quadrant 2 | High | Low |
| Quadrant 3 | High | High |
| Quadrant 4 | Low | High |

Applying this logic to the switches 25 and 26 results in dividing or splitting the parabolic waveform in half as described above, one side appearing across potentiometer 30 from the upper terminal of load resistor 27 and the other half appearing across potentiometer 31 from the lower terminal of load resistor 27. Not it is apparent that by having the convergence correction parabolic waves plit in half, the relative amplitudes of each half may be separately adjusted to achieve the desired "amplitude-tilt" to compensate for the offset positions of the delta electron guns.

Figure 4:
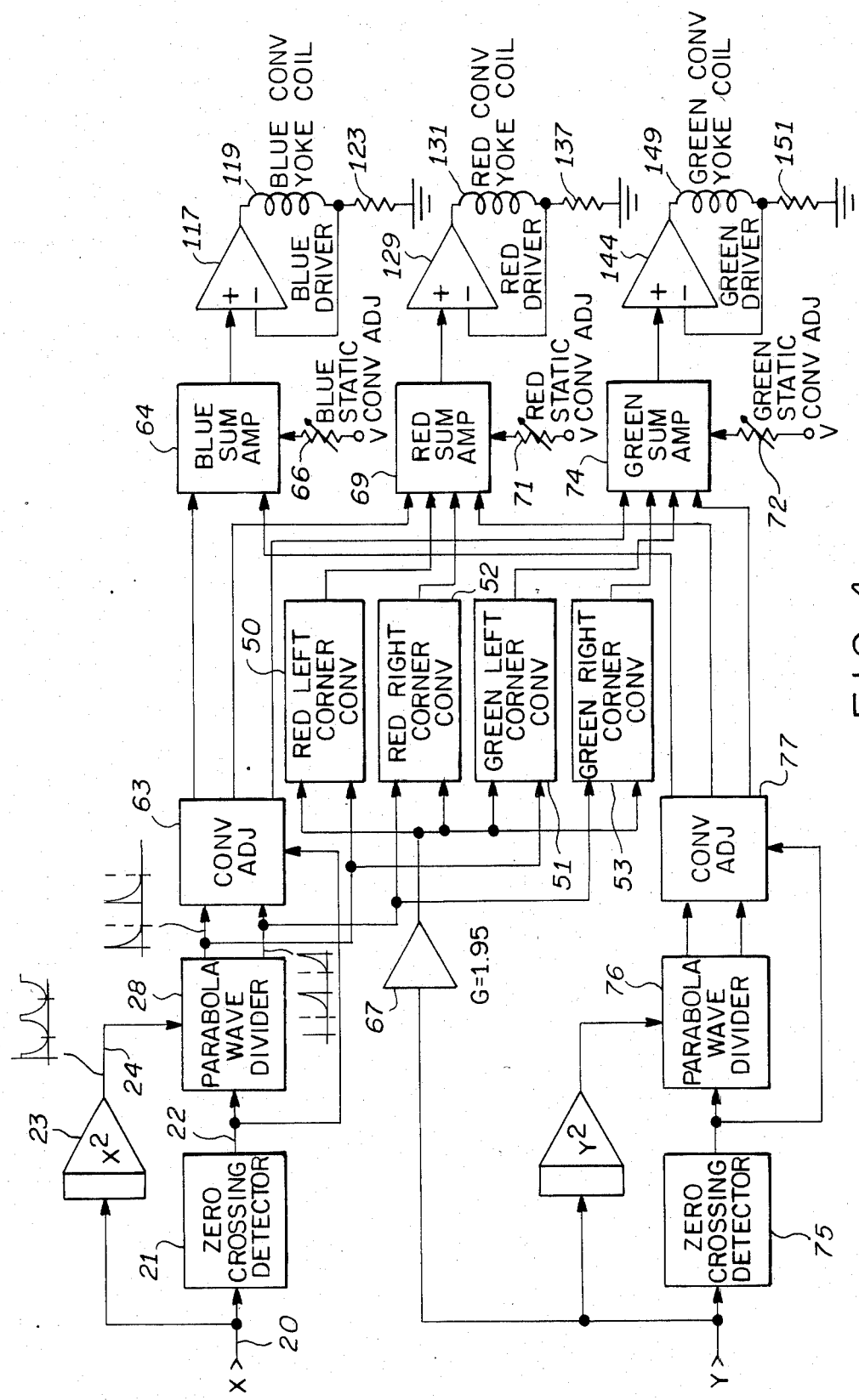
FIG. 4 is a block diagram of the convergence corrections system of the present invention.

The lower portion of FIG. 4 and FIG. 5B illustrates the circuitry for generating the separate halves of the vertical or Y component of the parabolic convergence correction waveforms appearing across potentiometers 32 and 33. Since this structure is essentially identical to that described above for the X component, its operation will be readily understood without repeating.

The parabolic wave halves appearing across potentiometers 30, 31 are inverted and gain adjusted by amplifiers 35, 36 and applied to the slides of potentiometers 40, 41. The latter potentiometers are differentially connected across the input terminals $S_1$ and $S_3$, and $S_2$ and $S_4$ of switches 45 and 46 respectively while the output terminals $D_1$, $D_2$ and $D_3$, $D_4$ of switches 45 and 46 are connected together to provide alternate halves of the red convergence correction signals and green convergence correction signals as will be described below. Again, the corresponding Y channel switches are similarly connected.

Figure 7:
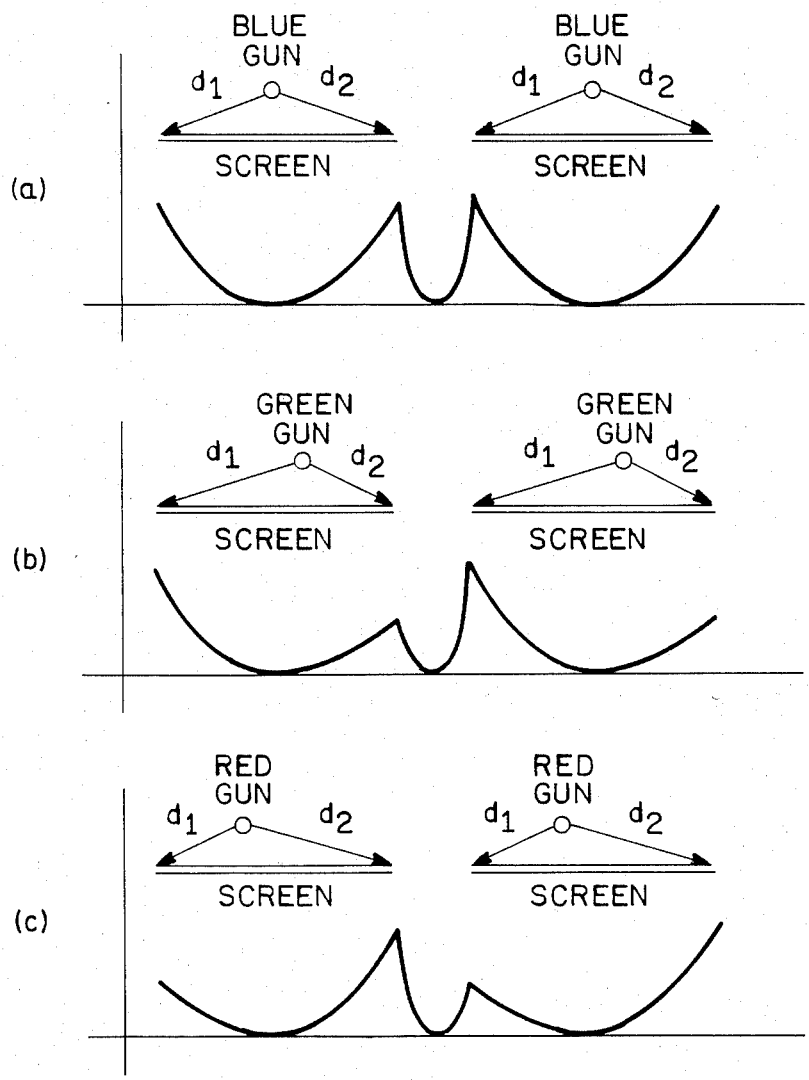
Figure 8:
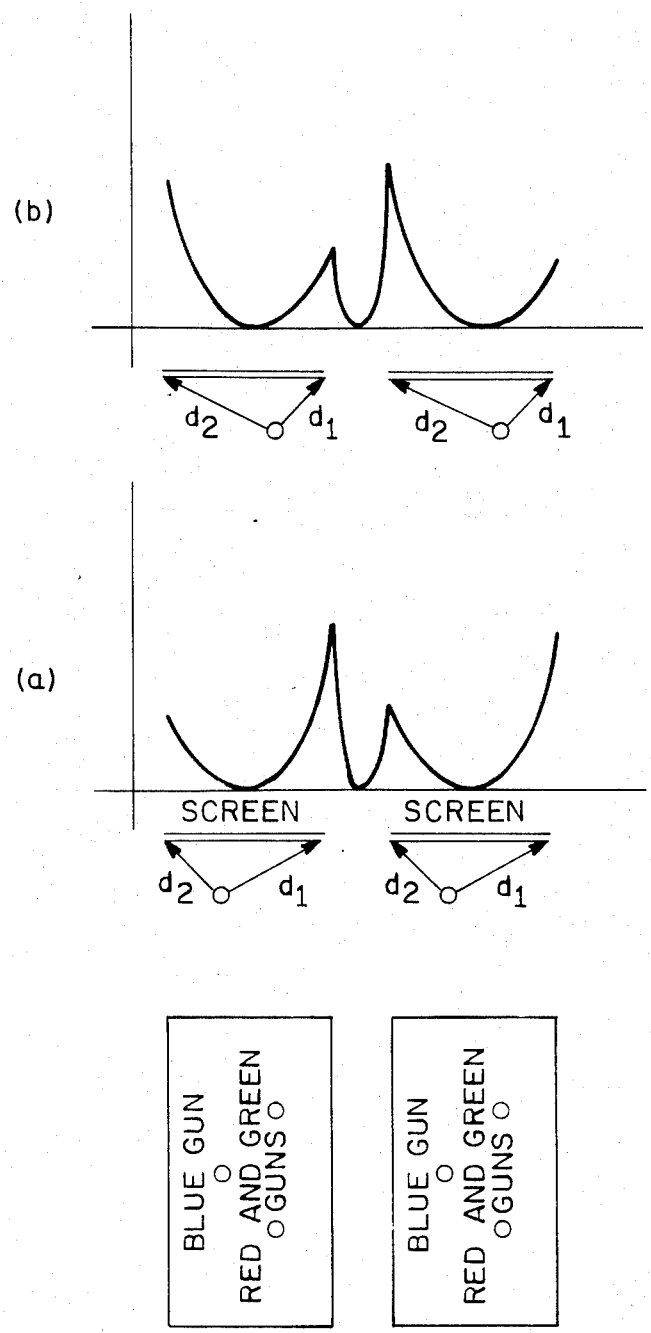

The effects of these gun offsets are graphically illustrated in FIGS. 7 and 8 for the horizontal and vertical deflections, respectively, together with the basic parabolic waveforms required for correcting the red, green and blue beams; two successive scan lines are shown. Also shown are the relative positions of the red, green and blue guns and their relative positions with respect to the viewing screen. Note that the amplitudes of each half of the waveforms differ due to the positions of the guns in the CRT neck. The red gun 17 and the red deflection center lie below and to the left of the tube axis; the green gun 18 below and to the right but in the same horizontal plane as the red gun, and the blue gun 16 is centered in the tube vertical axis and above the tube axis. The distances of each gun to the screen edges in the horizontal and vertical directions determine the correction waveform amplitudes. Therefore, for the horizontal deflections, since $D_2$ $D_1$ for the red gun, FIG. 7C, the right half amplitude is greater than the left half. For the green gun, FIG. 7B, $D_1$ $D_2$, the left half amplitude is greater than the right half. For the blue gun, FIG. 7A, $D_1 = D_2$ so that both half amplitudes are the same. The waveforms for the vertical deflections are derived in a similar manner.

Figure 9:
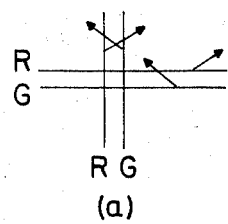
Figure 9:
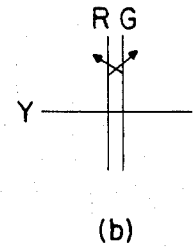
Figure 9:
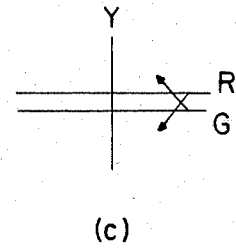
Figure 9:
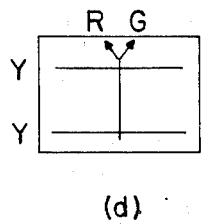
Figure 9:
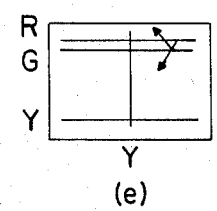
Figure 9:
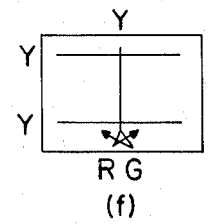
Figure 9:
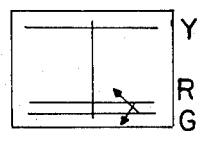
Figure 9:
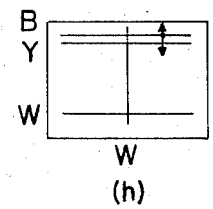
Figure 9:
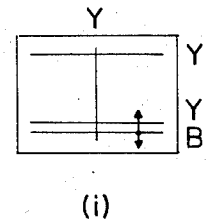
Figure 9:
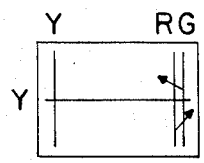
Figure 9:
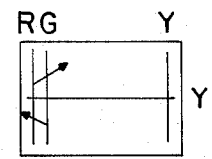
Figure 9:
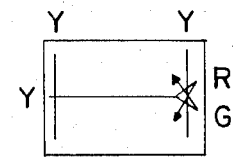
Figure 9:
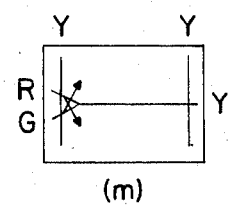
Figure 9:
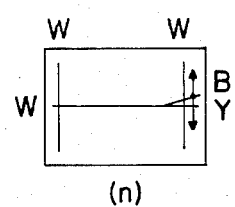
Figure 9:
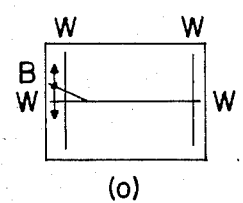

The amplitudes of each half of each of the horizontal and vertical convergence correction waveforms are made adjustable by the provision of six potentiometers in each of the X and Y channels shown in FIGS. 5A and 5B and contained within the convergence adjustments 35 and 36 of FIG. 4. In the X axis, these six potentiometers are the left and right parabola half tilt adjustments 30 and 31, the red and green differential adjustments 40 and 41, respectively, and the blue amplitude and tilt adjustments 42 and 43 respectively. The corresponding adjustment potentiometers for the Y axis are designated 32, 33; $40^1$, $41^1$ and $42^1$, $43^1$ respectively. The red and green controls are linked together to make the alignment of the red/green misconvergence easier and to reduce the number of adjustments. The differential amplitude adjustment technique used makes it possible to move the red and green lines equally vertically but in opposite directions horizontally (differential adjustment) which converges horizontal lines equally horizontally (see FIGS. 9a and b) but in opposite directions vertically (amplitude adjustment) which converges vertical lines (see FIGS. 9a and c). This is done at the top, bottom, left and right sides of the screen as shown by the line patterns of FIG. 9.

The foregoing adjustment principles may be readily understood by referring again to FIG. 5a. When the three electron beams are in the left half of the screen (quadrants 2,3) the output of the zero crossing detector 21 is high, closing switches $S_1 D_1$ of switch 25, $S_4 D_4$ of switch 26 and $S_1 D_1$ of switch 45, $S_3 D_3$ of switch 46. This places the first half of the split waveform across potentiometers 30 and 40. As potentiometer 30 is adjusted for increased amplitude, the vertical red/green lines at the left side move toward each other but the horizontal lines move upwards by equal amounts (FIG. 9a). Now, if potentiometer 40 is adjusted downwards, the green convergence signal increases while the red convergence signal decreases. This allows the horizontal lines to come together and form a yellow line because the green line moves further upwards while the red line backs off as shown by the arrow in FIG. 9c. At the same time, equal and opposite changes in signal amplitudes cause the red and green lines to move sideways and remain converged. FIGS. 9k and m show the adjustment effects on the left side of the screen.

When the beams cross into the right of the screen (quadrans 1,4), the output of the zero crossing detector 21 goes low closing switches $S_1 D_3$ of switch 25, $S_4 D_4$ of switch 26 and $S_1 D_3$ of switch 45, $S_2 D_4$ of switch 46. This places the second half of the split parabolic waveform across potentiometers 31 and 41. Potentiometer 31 is used to converge the vertical red/green lines at the right side of the screen and potentiometer 41 the horizontal lines in the same way as on the left screen half. The effects of adjustment of potentiometers 31 and 41 are shown in FIGS. 9j and l respectively. The convergence waveforms of FIG. 7 have, in effect, been generated in FIG. 5a by the ability to adjust potentiometers 30 and 40 independently of 31 and 41 thus controlling the parabolic waveform amplitudes independently on the left and right sides of the screen.

Since the blue convergence coil can effect the beam from blue gun 16 only in the vertical direction, only two horizontal convergence adjustments are required; blue horizontal lines left by potentiometer 43 and blue horizontal lines right by potentiometer 42. Potentiometer 43 controls the amplitude of the left side parabola signal fed to the blue convergence coil and moves the horizontal blue lines to converge with the red and green converged horizontal lines. Potentiometer 42 operates in the same manner on the right side of the screen, see FIGS. 9o and n respectively.

The vertical convergence channel of FIG. 5b operates in the same manner as the horizontal channel. In this case, potentiometers 32 and 40' converge the vertical and horizontal lines at the top of the screen (FIGS. 9d and e) while potentiometers 33 and 41' converge the vertical and horizontal lines at the bottom of the screen (FIGS. 9f and g). Blue convergence adjustments 42', 43' converge the blue horizontal lines at the top and bottom of the screen with the converged red and green lines (FIGS. 9h and i).

Figure 5C:
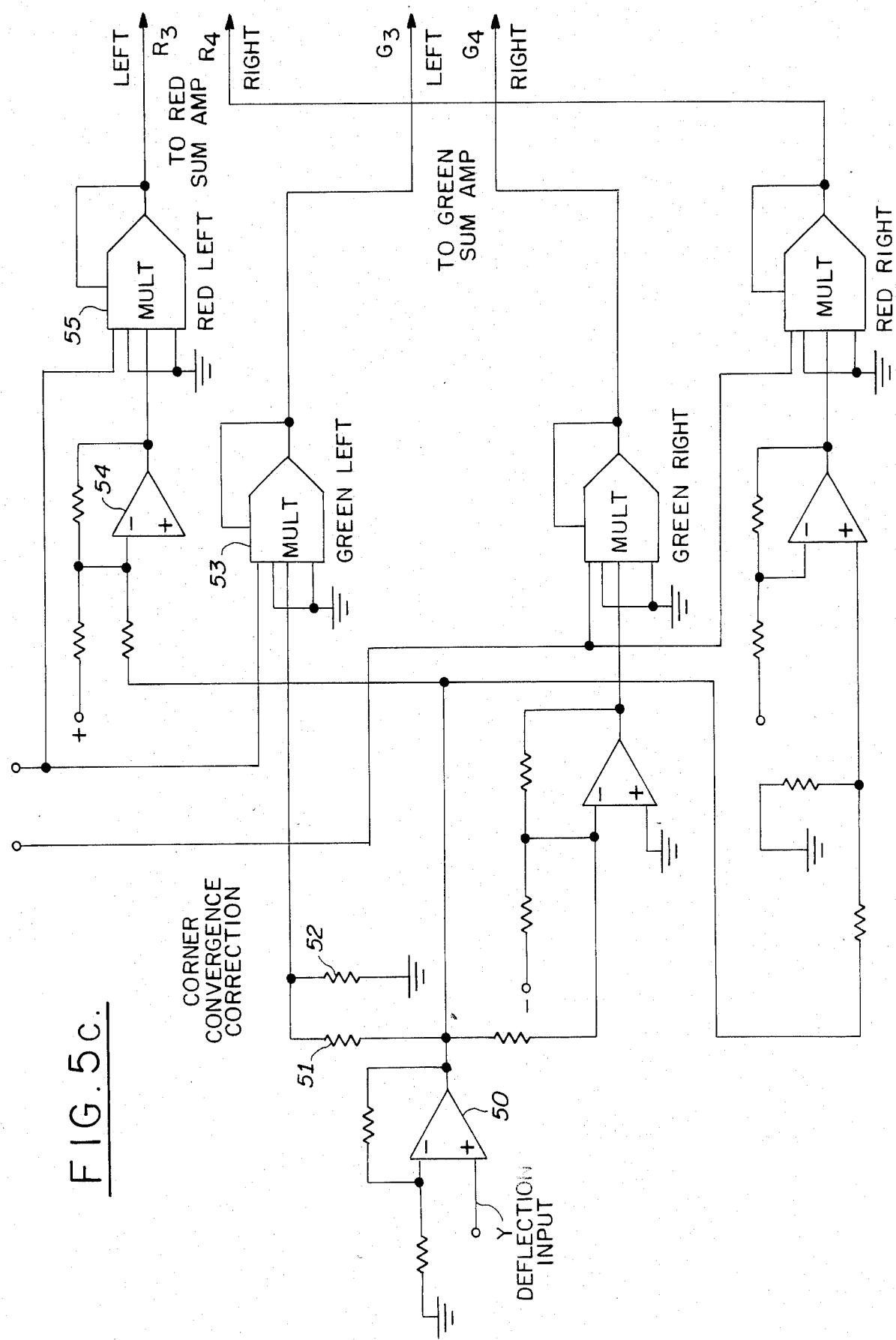

In addition to the circuitry of FIGS. 5a and 5b for generating the variable amplitude parabola halves or tilted parabolas, the further circuitry of FIG. 5c is provided for generating corner correction signals. While the convergence correction signals of FIGS. 5a and 5b provide precise convergence at the right and left and top and bottom center edges of the rectangular screen, convergence in back of the four corners will not be precisely converged. The corner correction waveforms therefore have zero amplitude at the center edge regions and increase to their maximum amplitudes at the screen corners. The corner correction waveforms are required for rectangular screens because the magnetic flux densities required to converge the beams in the corner areas is not the resultant flux density produced by the sum of the vertical and horizontal half parabola signals.

The cicuitry for generating the corner correction waveforms is partitioned into the four separate circuits of FIGS. 4 and 5c; vis. left side red and green correction circuits 50, 51 respectively, and right side red and green correction circuits 52, 53 respectively. Generally, the individual corner components are generated by multiplying the Y deflection signal, which is inverted and level shifted differentially in each case, by the split parabola wave signals across potentiometers 30 and 31 (FIG. 5a) corresponding to the position of the beams on the screen. The blue beam again does not require corner correction since it is aligned with the vertical screen axis.

Figure 10:
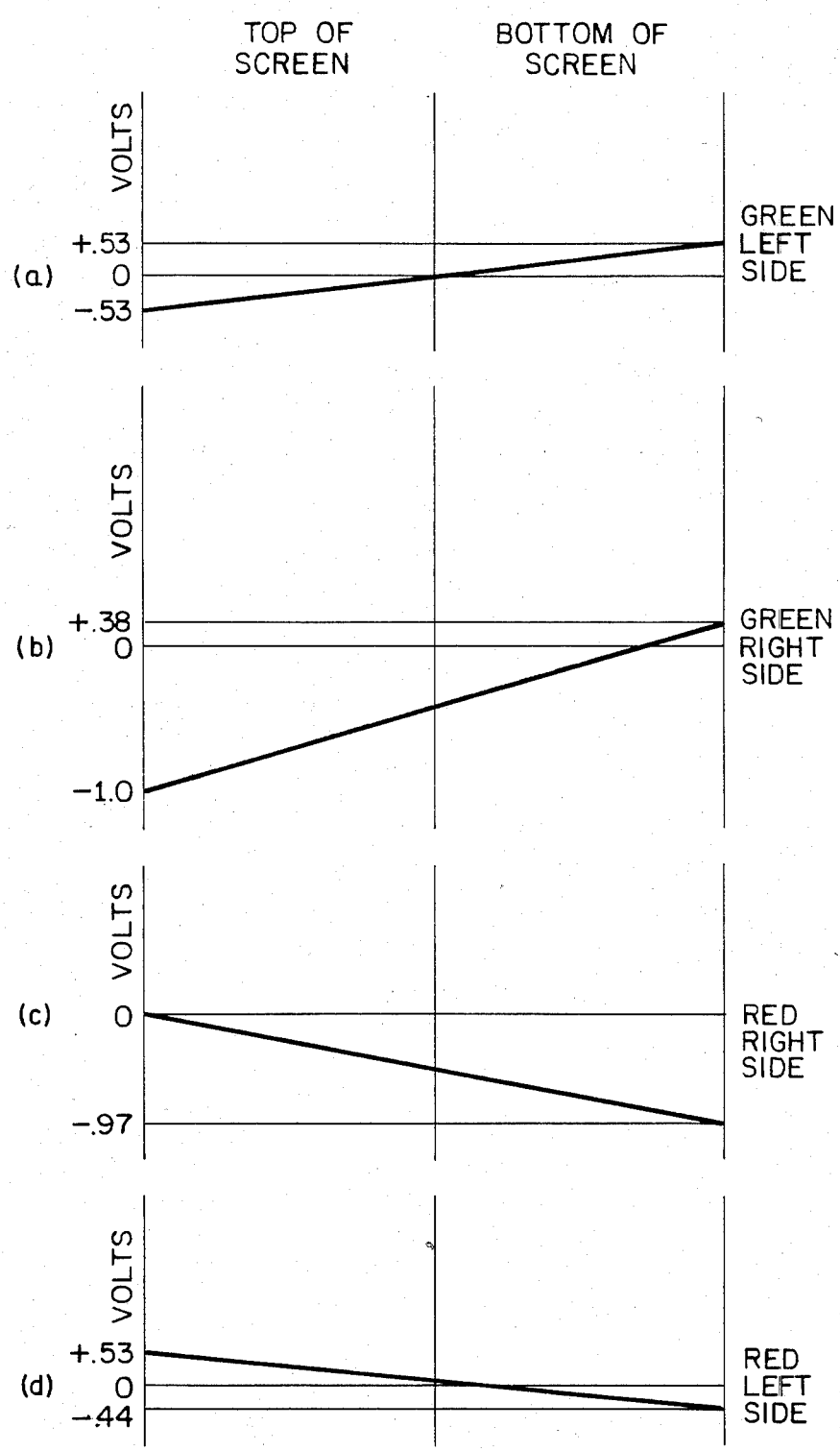

More specifically, the corner correction circuits consist of a gain scaling and level shifting stage followed by an anolog multiplier to generate the required waveforms as shown in FIG. 10. It will be understood by those in the CRT art that these specific waveforms, as well as those of FIGS. 7 and 8, are applicable to a particular CRT and deflection yoke design and may, of course, differ in detail for other CRT and yoke design applications.

To synthesize the green left corner correction waveform of FIG. 10a, the Y-deflection signal is buffered by amplifier 50 having a predetermined gain. The amplifier output is suitably attenuated as by resistors 51, 52 to produce the desired signal level and then supplied to multiplier 53 where it is multiplied by the left half of the X-channel parabolic waveform across potentiometer 30. The multiplier output is thus the green left waveform shown in FIG. 10a.

The red left corner convergence correction waveform, FIG. 10d, is similarly generated by suitably scaling the Y-deflection signal output of amplifier 50 at amplifier 54 and multiplying its output in multiplier 55 by the left half of the horizontally divided parabolic waveform across potentiometer 30. The green right and red right corner convergence correction waveforms shown in FIGS. 10b and c respectively are generated in the same manner as above by scaling the Y-deflection signal, differentially inverted, and multiplying by the right half of the split parabolic waveform apprearing across potentiometer 31 of FIG. 5a.

Figure 5D:
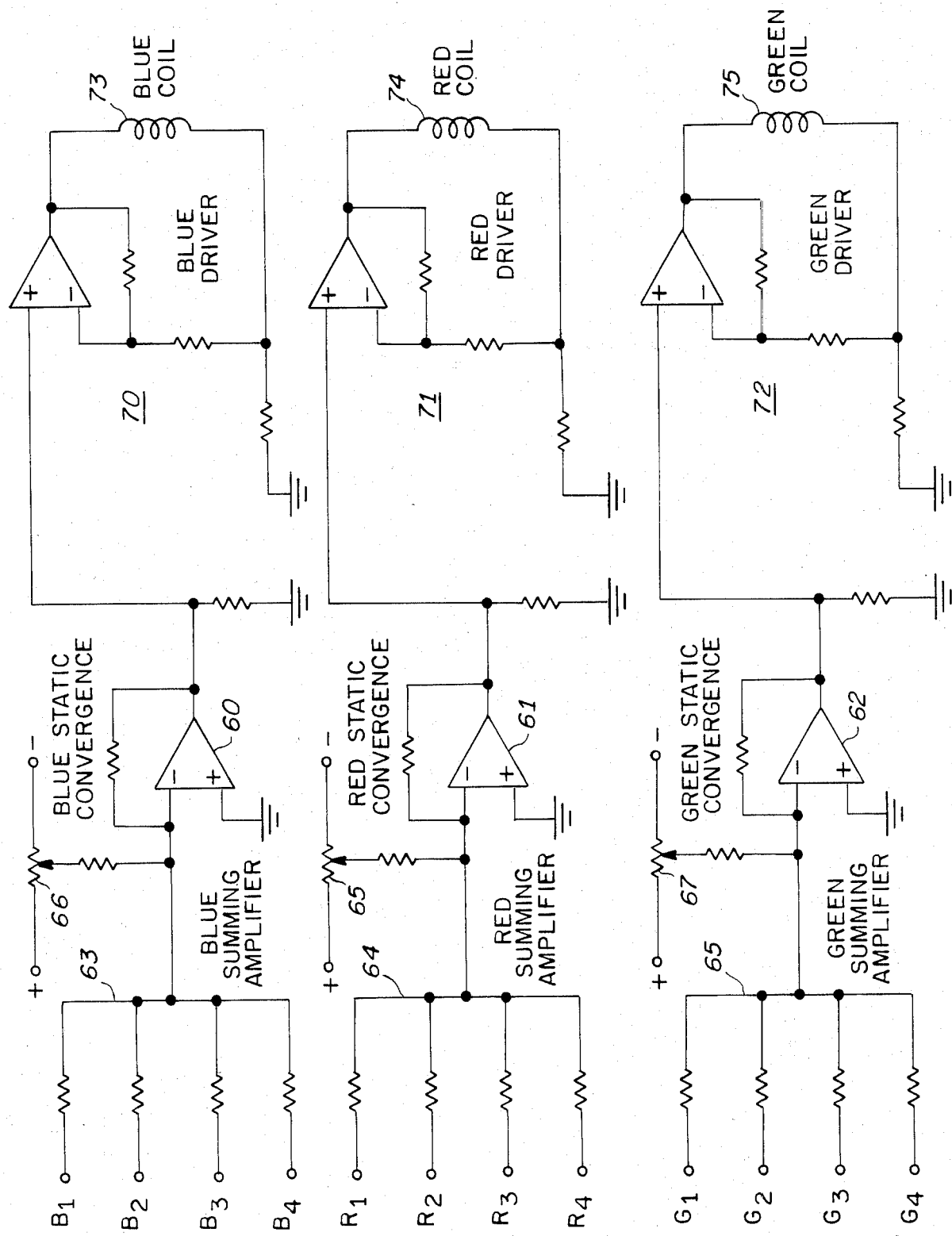

The corner convergence correction waveform signals just described in connection with FIG. 5c and the horizontal and vertical divided and tilted parabolic waveform signals described above in connection with FIGS. 5A and 5B, all as identified along the right side of these figures, are supplied to corresponding blue, red and green summing amplifiers 50, 61 and 62, respectively, through parallel summing networks 63, 64 and 65, respectively of FIG. 5D. For example, the red convergence correction signal consisting of the horizontally divided and scaled (or tilted) parabola half on lead $r_1$ (FIG. 5A) and corresponding vertically divided and scaled (or tilted) parabola half (FIG. 5B) are added together through the resistors at terminals $R_1$ and $R_2$ of the summing amplifier 61 of FIG. 5D. The red left and red right corner correction waveform signals $R_3$ and $R_4$ from FIG. 5C are added together through the resistors at terminals $R_3$ and $R_4$ of summing amplifier 61. The blue and green convergence correction waveform signals are summed in the same manner as shown.

In summary, each of the complete red and green convergence signals supplied at the outputs of amplifier 61 and 62 consists of several components; the left and right halves of the horizontal divided and amplitude adjusted (tilted) parabolic waves, the left and right corner convergence correction waves and the static convergence biases. The complete blue convergence signal consists of all of the above components except, of course, there are no corner convergence components.

One of the advantages of the active convergence correction system of the present invention is that static conversion (converging the undeflected blue, red and green beams at the center of the screen) may be easily accomplished electronically. Thus, static convergence is provided by supplying separately adjustable bias signals to each of the blue, red and green summing amplifiers 60, 61 and 62 of FIG. 5D. For example, to statically converge the red beam, a potentiometer 65 supplied from a suitable plus and minus voltage supply, is adjusted so that the red beam is converged on a corresponding red phosphor dot at the screen center. Similar potentiometers 66 and 67 are provided for statically converging the blue and green beams in corresponding blue and green phosphor dots of the phosphor triad at the screen center.

Figure 3:
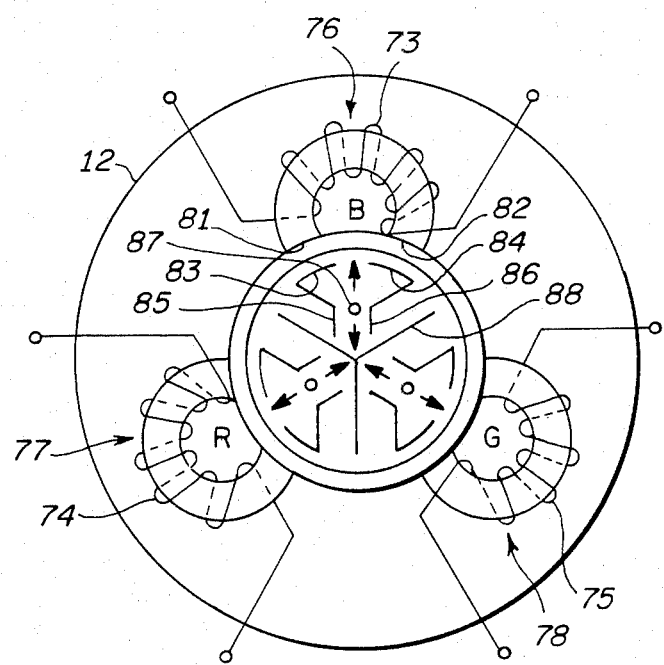
FIG. 3 is a cross-section of the convergence yoke of the CRT of FIG. 1 taken on line 3-3 thereof.

The outputs of the blue, red and green summing amplifiers 60, 61 and 62 are applied to the inputs of the driver amplifiers 70, 71 and 72, respectively, for driving the blue, red and green convergence correction coils 73, 74 and 75 of the conversion correction yoke assembly 12, shown in FIGS. 1 and 3. The driver amplifiers are configured as transconductance or voltage-to-current converters to provide precisely controlled currents to the yoke coils. These amplifiers are conventionally designed to provide dominant pole frequency which may be varied so that it may be critically damped with the yoke coil inductance. Such critical damping allows the drivers to settle in the shortest possible time with minimum ringing.

In accordance with the present invention, the convergence correction yoke 12 of FIGS. 1 and 3 provides substantial improvement in structure and operation over prior art yokes. In general, the yoke assembly comprises three toroidal cores and winding assemblies 76, 77 and 78 for the blue, red and green electron guns 16, 17 and 18, respectively. Each core and winding assembly, for example, the blue core 76 comprises a sandwich of two ferrite toroids 80, typically a little less than one inch in diameter and together about one quarter inch thick. The core has a section cut out leaving angularly spaced pole pieces 81,82; the core radial thickness and axial length being such that the pole piece surfaces corresponds in dimensions to the surface area dimensions in angular length and axial length of the internal pole pieces 83, 84 of the blue electron gun assembly. Note that the latter, in the application of the present embodiment of the invention, is so shaped as to conduct the magnetic flux lines to internal pole pieces 85, 86 which interact with the blue electron beam 87, isolation barriers 88 are also provided. It will also be noted that the angular length of the cutout section will depend generally upon the diameter of the CRT neck. For example, for a tube neck diamater of say 36.5 mm, the cutout will subtend about 126°; proper shaping of the pole pieces will assure maximum magnetic coupling with the internal pole pieces. After proper shaping, the sandwiched cores are wrapped with tape and wound with transformer wire. In the exampe, 70 turns of 32 gauge copper wire were evenly spaced over the core periphery to provide winding 73. This provides the required inductance resonance and distributed capacitance for the particular application. It is noted that distributed capacitance is low due to the winding spacing about the toroid surface. The yoke winding 73 resonate with this capacitance and the self resonance increases. This is advantageous since at frequencies above resonance, the yoke does not act as a pure current transducer to magnetic field since a portion of the drive current flows in the capacitive elements thereby limiting maximum closed loop small signal bandwidth attainable in the yoke driver 70. The self resonance should preferably be at least an octave above the samll signal bandwidth. The core design clearly minimizes magnetic field fringing, increasing the yoke's sensitivity and efficiency.

After each core is wrapped and wound, they are potted in a suitable insulating plastic mold to form the completed yoke assembly 12 which is conventionally clamped to the tube neck with the core pole faces precisely aligned with the internal gun pole pieces 83, 94, etc.

While the invention has been described in its preferred embodiments, it is to be understood that the words which have been used are words of description rather than of limitation and that changes may be made within the purview of the appended claims without departing from the true scope and spirit of the invention in its broader aspects

I claim:

1. An improved conveyance correction apparatus for a color cathode ray tube display system of the shadow mask type having a display screen, blue, red, and green electron guns arranged in a delta configuration within the tube neck for producing blue, red and green electron beams and horizontal and vertical deflection means responsive to corresponding deflection signals for deflecting said beams horizontally and vertically across said display screen, each electron gun having convergence correction pole pieces for further deflecting each of said beams in accordance with convergence correction signals, said correction apparatus including signal responsive coil means coupled with each of said pole pieces for producing blue, red and green convergence correction magnetic fields, each of said coil means comprising an inductor with a generally C-shaped core responsive to combined horizontal and vertical components of said convergence correction magnetic fields; squaring means responsive to said horizontal and vertical deflection signals, said signals comprising at least random stroke vector signals, for producing corresponding generally parabolic waveshape convergence correction signals, wherein said squaring means comprises means for producing signals proportional to the square of each of said horizontal and vertical deflection signals; wave splitter means also responsive to said horizontal and vertical deflection signals for splitting each of said parabolic waveshape signals into half parabolic waveshape signals corresponding to the left and right and top and bottom half sectors of said display screen respectively; means for separately adjusting the amplitudes of each half of each of said split parabolic waveform signals and for supplying left and right and top and bottom half blue, red and green convergence correction signals; means for respectively recombining each half of each of said blue, red and green convergence correction signals, and for combining horizontal and vertical components thereof to provide composite blue, red and green convergence correction signals; and means for supplying said composite convergence correction signals to said signal responsive coil means; wherein said wave splitter means is characterized by:

(a) horizontal and vertical zero crossing detection means for providing signals dependent upon whether said beams are deflected into said right and left top and bottom halves of said display screen, and (b) switch means responsive to said horizontal and vertical squaring means and said zero crossing detector means for splitting said horizontal and vertical parabolic waveshape signals.

2. A convergence correction apparatus as set forth in claim 1 wherein said switch means comprises, for each said horizontal and vertical parabolic waveshape signals, (a) first and second switch means having input terminals responsive to said parabolic waveshape signal output of said squaring means, and first and second signal responsive means connected to the output terminals thereof, and (b) switch operating means responsive to the output of said zero crossing parabolic waveshape signal to each of said first and second signal responsive means.

3. A convergence correction apparatus as set forth in claim 2 wherein said first and second signal responsive means comprises (a) first and second potentiometer means, and (b) manually adjustable means for separately varying the amplitudes of each half of said parabolic waveshape signals.

4. A convergence correction apparatus as set forth in claim 3 wherein said recombining means comprises, for each said horizontal and vertical parabolic waveshape signals, (a) third and fourth switch means, each having a first input terminal responsive to the output of said first potentiometer means and a second input terminal responsive to the output of said second potentiometer means, said third and fourth switch means having their respective output terminals connected to said signal responsive coil means, (b) switch operating means responsive to the output of said zero crossing detector for operating said third and fourth switch means simultaneously with said first and second switch means.

5. A convergence correction apparatus as set forth in claim 4 wherein said third and fourth switch output terminals are connected to said red and green signal responsive coil means respectively.

6. A convergence correction apparatus as set forth in claim 5 wherein said recombining means further includes for each said horizontal and vertical parabolic wave signals, (a) third and fourth potentiometer means each having its winding connected between said first and second input terminals of said third and fourth switch means and each wiper thereof connected to said first and second potentiometer means, whereby said red and green signal responsive coil means is differentially responsive to each said first and second potentiometer means.

7. A convergence correction apparatus as set forth in claim 6 wherein for each said horizontal and vertical parabolic waveshape signal, said blue signal responsive coils means is connected to the respective outputs of said first and second switch means, and fifth and sixth potentiometer means responsive thereto for varying the relative amplitudes of each of said first and second switch means outputs.

8. A convergence correction apparatus as set forth in claim 7 wherein said recombining means comprises (a) red, green and blue summing amplifier means responsive to the outputs of said third and fourth switch means and said fifth and sixth potentiometer means and said third and fourth switch means for controlling said red, green and blue signal responsive coil means, and (b) each of said summing amplifier means further including (i) static convergence potentiometer means for providing a bias signal for statically converging said beams in the absence of said horizontal and vertical deflection signals.

9. A convergence correction apparatus as set forth in claim 1 wherein said signal responsive coil means comprises an annular molding adapted to be secured in said CRT neck and including C-shaped cavities for receiving said C-shaped core and coil assemblies.

* * * * *